United States Patent
Ohtsubo et al.

(10) Patent No.: US 7,644,193 B2
(45) Date of Patent: Jan. 5, 2010

(54) RECORDING DEVICE CONTROL APPARATUS

(75) Inventors: Shohji Ohtsubo, Osaka (JP); Kazuhiko Yamashita, Kyoto (JP); Yuichi Kato, Aichi (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 10/574,619

(22) PCT Filed: Dec. 17, 2004

(86) PCT No.: PCT/JP2004/018915

§ 371 (c)(1),
(2), (4) Date: Apr. 5, 2006

(87) PCT Pub. No.: WO2005/059757

PCT Pub. Date: Jun. 30, 2005

(65) Prior Publication Data

US 2007/0067507 A1 Mar. 22, 2007

(30) Foreign Application Priority Data

Dec. 19, 2003 (JP) .............................. 2003-422503

(51) Int. Cl.
*G06F 3/00* (2006.01)
(52) U.S. Cl. .............................. 710/6; 711/158; 718/103
(58) Field of Classification Search .................. 710/29, 710/61, 6, 8, 12
See application file for complete search history.

(56) References Cited

U.S. PATENT DOCUMENTS 5,438,665 A * 8/1995 Taniai et al. .................. 710/25
5,794,020 A * 8/1998 Tanaka et al. ................ 713/401
6,275,878 B1 * 8/2001 Yashima et al. ............... 710/61
6,304,923 B1 * 10/2001 Klein ........................... 710/41
6,408,359 B1 6/2002 Ito et al.
6,834,315 B2 * 12/2004 Johnson ......................... 710/6

FOREIGN PATENT DOCUMENTS

JP   10-275059    10/1998
JP   2003-224813   8/2003

* cited by examiner

Primary Examiner—Henry W. H. Tsai
Assistant Examiner—Elias Mamo
(74) Attorney, Agent, or Firm—Wenderoth, Lind & Ponack, L.L.P.

(57) ABSTRACT

A recording device control apparatus includes a reception unit operable to receive transfer requests and a transfer request specification unit operable to perform transfer criterion judgment processing and same-area judgment processing. When a targeted transfer request fulfills a condition of a negative judgment result in both processes, the apparatus specifies the related data of a targeted transfer request as a transfer target. The same-area judgment process is for judging whether or not a transfer request that has area information identical to area information included in the targeted transfer request was received before the targeted transfer request was received. Furthermore, the apparatus includes a transfer unit operable to transfer the data specified by the transfer request specification unit. By transferring data to the same area in the order specified by the transfer specification unit, inconsistencies are avoided in the data in the recording device control apparatus.

10 Claims, 5 Drawing Sheets

| iNODE | 1 | ... | N1 | N2 | ... | N |
|---|---|---|---|---|---|---|
| USAGE STATE | 1 |  | 1 | 1 |  | 1 |
| SECTOR |  |  |  |  |  |  |

| BLOCK | 1 | 2 | ... | K1 | K2 | ... | K |
|---|---|---|---|---|---|---|---|
| USAGE STATE | 0 | 0 |  | 1 | 1 |  | 1 |

FIG.3B (30)

| iNODE | 1 | ... | N1 | N2 | ... | N |
|---|---|---|---|---|---|---|
| USAGE STATE | 1 |  | 0 | 1 |  |  |
| SECTOR |  |  | 100 |  |  |  |

| BLOCK | 1 | 2 | ... | K1 | K2 | ... | K |
|---|---|---|---|---|---|---|---|
| USAGE STATE | 0 | 0 |  | 0 | 1 |  | 1 |

FIG.3C (40)

| iNODE | 1 | ... | N1 | N2 | ... | N |
|---|---|---|---|---|---|---|
| USAGE STATE | 1 |  | 0 | 0 |  |  |
| SECTOR |  |  | 100 | 200 201 |  |  |

| BLOCK | 1 | 2 | ... | K1 | K2 | ... | K |
|---|---|---|---|---|---|---|---|
| USAGE STATE | 1 | 1 |  | 0 | 0 |  | 1 |

FIG.4A

| FILE HANDLE | PRIORITY LEVEL |
|---|---|
| A | 1 |
| B | 2 |

FIG.4B

| IDENTIFIER | FILE HANDLE | DATA TYPE | ACCESS TYPE | SECTOR LOCATION | MEMORY LOCATION | SIZE |
|---|---|---|---|---|---|---|
| 1 | A | FILE DATA | WRITE | 100 | ... | ... |
| 2 | B | FILE DATA | WRITE | 200 | ... | ... |
| 3 | A | MANAGEMENT INFORMATION | WRITE | 500 | ... | ... |
| 4 | B | FILE DATA | WRITE | 201 | ... | ... |
| 5 | B | MANAGEMENT INFORMATION | WRITE | 500 | ... | ... |
| ... | | | | | | |

RECORDING DEVICE CONTROL APPARATUS

CROSS-REFERENCES TO RELATED APPLICATIONS

This application is the National Stage of International Application No. PCT/JP2004/018915, filed on Dec. 17, 2004.

BACKGROUND OF THE INVENTION

1. Field of the Invention

The present invention relates to a recording device control apparatus, and in particular to a technique for controlling transfer of data based on transfer requests successively issued by application programs (hereinafter called "applications") to transfer data to a single recording device.

2. Description of the Related Art

Digital recorders of recent times are capable of processing a plurality of read and write requests with respect to one recording device.

Take for example a case in which television program data is recorded to a hard disk at the same time as data recorded on a DVD (Digital Versatile Disc) is dubbed to the same hard disk. When the file system receives respective write requests from the recording application and the dubbing application, write processing is performed in the following way.

The file system, which holds management information such as file data location information and free-block information, sends file data and management information write requests to the device driver so that synchronization of data and management information written to the hard disk can be achieved.

The device driver writes recording and dubbing data and data of management information to the hard disk in the order requested by the file system.

In this way, even if respective management information of the recording data and the dubbing data is recorded to the same area, inconsistencies in the management information and the like can be avoided as long as the data is written to the device driver in the order sent from file system.

However, the following problem may occur when writing the recording data. Because the television program data is sent and written to the buffer at a fixed transmission bit rate, if there is a delay in writing from the buffer to the hard disk, the buffer capacity may become full with television program data and recording thereof may fail. In view of this problem, a control apparatus has been disclosed for prioritively writing data relating to write requests for recording, where writing to the hard disk cannot be delayed (see Japanese Laid Open Patent Application No. H10-275059, for example).

BRIEF SUMMARY OF THE INVENTION

Problem to be Solved by the Present Invention

However, when this control apparatus is used, inconsistencies may occur in data of the management information or the like because the device driver does not write data to the hard disk in the order received from the file system.

Effects of the Invention

The present invention has a purpose of providing a recording device control apparatus that controls transfer of data relating to transfer requests so that inconsistencies are avoided in data of management information and the like when a transfer order is changed in order to transfer specific data according to priority.

The stated object is achieved by a recording device control apparatus that successively receives transfer requests and controls transfer of data relating to the transfer requests to and from a recording device, each transfer request includes (i) area information that shows an area that is a transfer destination or a transfer source in the recording device and (ii) type information for specifying a transfer data type. The recording device control apparatus includes a reception unit operable to receive the transfer requests, and a transfer request specification unit operable to perform transfer criterion judgment processing and same-area judgment processing with respect to each of specification target requests which are received transfer requests whose related data has not been transferred. The transfer request specification unit is also operable, when a targeted transfer request fulfills a condition of a negative judgment result in both of the processing, specify the related data of the targeted transfer request as a transfer target. The transfer criterion judgment processing is for judging whether or not the targeted transfer request is a transfer-withhold target, based on a predetermined transfer criterion that defines a transfer order for the targeted transfer request and one or more transfer requests having different type information to the targeted transfer request, and the same-area judgment processing is for judging whether or not a transfer request that has area information identical to area information included in the targeted transfer request was received before the targeted transfer request was received. Moreover, the recording device control apparatus includes a transfer unit operable to transfer the data specified by the transfer request specification unit.

According to the stated structure, for example, in a recording device control apparatus that records file management information in a specific area in the recording device, when the file system receives a transfer request for dubbing data and a transfer request for recording or the like of which transfer of data cannot be delayed, the file system reads the management information in the recording device to the memory, determines the write location of the recording and dubbing data and successively updates the management information in the memory recording device. The control apparatus also sends each write request to the device driver such that synchronization of the data and management information is achieved in the recording device.

The device driver is able to write, according to priority, the recording data according to transfer criterion judgment processing, and write the management information so that it is in the order that it was sent by the file system according to the same-area judgment processing. This prevents management information that was updated later by the file system from being overwritten with management information that was updated earlier. Furthermore, when transfer requests are issued for writing data to and reading data from a same sector, reading of data from a sector to which data has not yet been written can be prevented.

Furthermore, the recording device control apparatus may have, in the recording device, a management area for storing management information that is for managing data locations in the recording device. The transfer request specification unit may further perform request judgment processing which is for, when the targeted transfer request is a transfer request with respect to the management area, judging whether or not a transfer request having identical type information to the targeted transfer request was received before the targeted transfer request was received. When the targeted transfer request fulfills the condition and, in addition, a judgment result of the request judgment processing is negative, the transfer request specification unit may specify transfer data relating to the transfer request as data to be transferred.

According to the stated structure, for example, if management information for recording files and management information for dubbing files is stored in a same area, the management information is updated in the order in which it was issued by the file system. This prevents management information that should be updated later from being updated before management information that should be updated earlier, and management information that should be updated later from being overwritten with management information that should be updated earlier. Furthermore, since management information is not written before recording and dubbing data relating to the management information, inconsistencies such as files being unable to be recognized by the file system are prevented.

Furthermore, the transfer request specification unit may further perform specification exclusion processing when the targeted transfer request, having fulfilled the condition and the judgment result of the request judgment processing being negative, is with respect to management information. Moreover, when a transfer request that has not been transferred and, with respect to the management area, was received after the targeted transfer request was received, the specification exclusion process is for excluding the targeted transfer request from being a specification target request without specifying the targeted transfer request as a transfer target.

According to the stated structure, for example, if management information for recording data and dubbing data are stored in a same management area in the recording device, when the device driver receives write requests for recording and dubbing data and write requests for a plurality of pieces of management information, part of the contents of earlier management information among the write requests for management information are duplicated in the management information for which the write request was received last. For this reason, if recording data and dubbing data relating to the management information received last are transferred before the management information received last, the time required to write the management information can be reduced by omitting transfer of the duplicated part of the management information and processing the management information write request received last.

Furthermore, the reception unit may further receive an omission instruction that instructs that transfer of redundant management information is to be omitted, and the transfer request specification unit may perform the specification exclusion processing only when the reception unit has received the omission instruction.

According to the stated structure, for example, only when the file system issues an instruction to omit processing of a write request whose management information is a duplicate of management information of another write request, the device driver can omit processing of the write request with the duplicate management information.

Therefore, when placing importance on data integrity, all management information update requests issued from the file system are processed unless an instruction for omission of processing of a management information write request is sent to the device driver, and, the possibility that data that has already been written will be rendered useless if a power cut or the like occurs is low.

Furthermore, the predetermined criterion may be predetermined priority levels that show a transfer order for transfer data according to the type information, and the transfer criterion judgment processing may be for judging that the targeted transfer request is a transfer-withhold target when a priority level of a transfer request that includes different type information to the type information of the processing-target transfer request is higher than the priority level of the processing-target transfer request.

According to the stated structure, transfer priority levels can be determined in advance according to the types of the data to be transferred, and the device driver can transfer data to the recording device in the order from the data relating to transfer requests having high priority.

Furthermore, the present invention is a recording device control apparatus that successively receives transfer requests and controls transfer of data relating to the transfer requests to and from a recording device. Each transfer request includes (i) area information that indicates an area that is a transfer destination or a transfer source in the recording device, and (ii) type information for specifying a type of transfer data. The recording device control apparatus includes a reception unit operable to receive the transfer requests and a transfer request specification unit operable to perform transfer criterion judgment processing, management information judgment processing, and request judgment processing with respect to each of specification target requests which are received transfer requests whose related data has not been transferred. When a targeted transfer request fulfills a condition of a negative judgment result in all of the processing, the transfer request specification unit specifies the related data of the targeted transfer request as a transfer target, the transfer criterion judgment processing being for judging whether or not the targeted transfer request is a transfer-withhold target, based on a predetermined transfer criterion that defines a transfer order for the target transfer request and one or more transfer requests having different type information to the targeted transfer request. The management information judgment processing is for, when the targeted transfer request is a transfer request for management information, judging whether or not a transfer request for transferring management information was received before the targeted transfer request was received, and the request judgment processing being for judging whether or not a transfer request having identical type information to the targeted transfer request was received before the targeted transfer request was received. Moreover, the recording device control apparatus includes a transfer unit operable to transfer the data specified by the transfer request specification unit.

DETAILED DESCRIPTION OF THE INVENTION

The following describes a recording device control apparatus relating to a first embodiment of the present invention.

<Overview>

The recording device control apparatus of the first embodiment records a plurality of pieces of file data to a single recording device, and records management information of recorded files to a specific area of the recording device. This management information is managed by one file system.

Furthermore, the file system receives data indicating a request to transfer data (hereinafter referred to as a "transfer request") from an application, determines which file the data relating to the received transfer request (hereinafter referred to as "transfer target data") belongs to, designates an area in the recording device that is a transfer destination or a transfer origin, and sends the transfer request to the device driver after attaching priority information which prescribes a transfer order in accordance with the type of the transfer target data.

On receiving transfer requests that have priority information attached thereto from the file system, the device driver holds the transfer requests in a queue in the order in which they were received. When transfer requests are held in the queue, the device driver determines a transfer request for transferring data to a designated area in the recording device, and transfers the transfer target data to the recording device.

Here, the transfer requests for management information are transfer requests with respect to a same area. A same area may be a management area group in which each sector is a different management area, or may be one sector. In the first embodiment, a case of the management information being stored in one sector is described.

<Structure>

Figure 1:
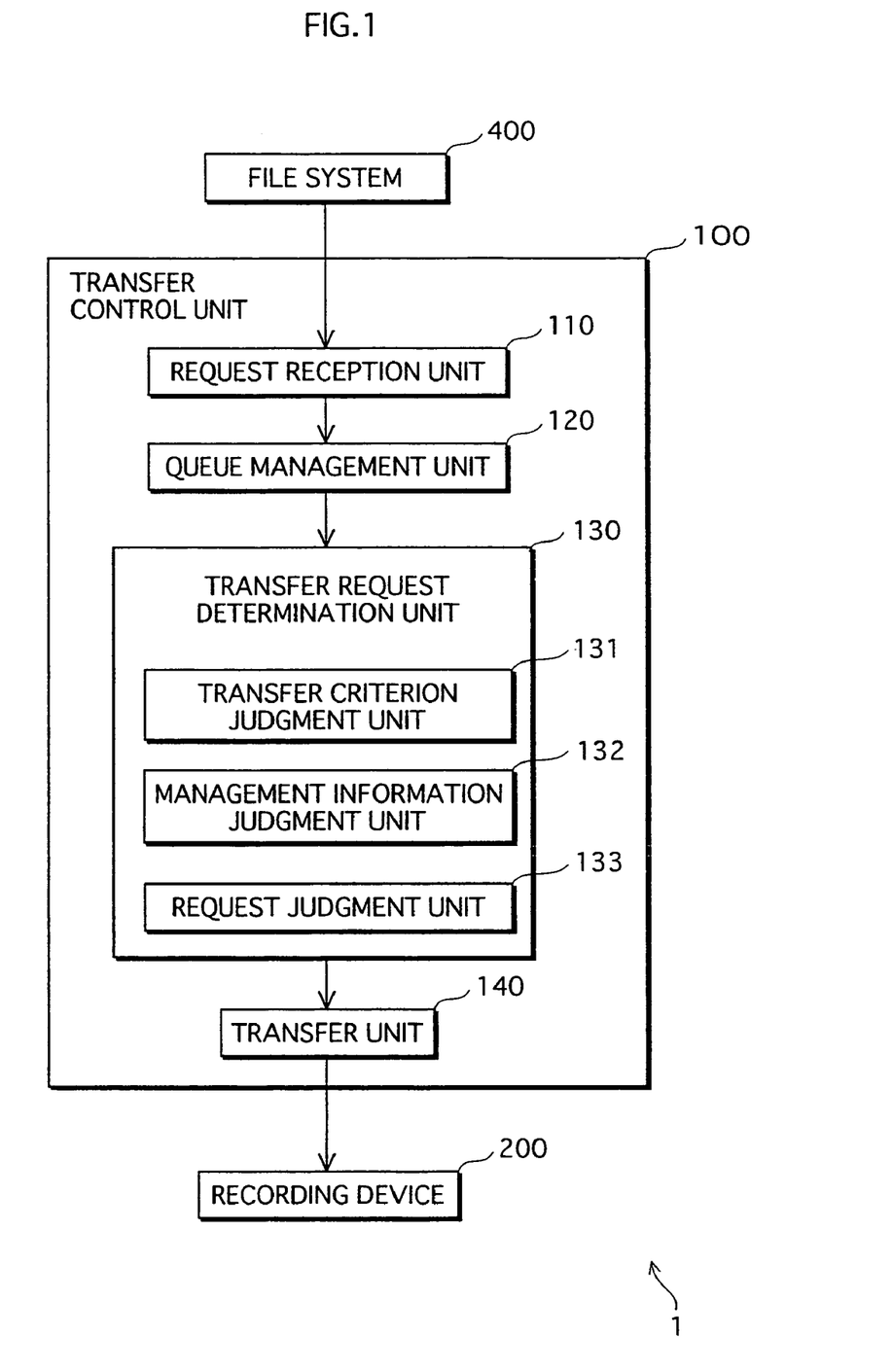
FIG. 1 is a structural diagram of a recording device control apparatus 1 relating to a first embodiment of the present invention.

FIG. 1 is a functional block diagram of a recording device control apparatus 1 of the present invention.

The recording device control apparatus 1 is composed of a file system 400, a transfer control unit 100, and a recording device 200.

Specifically, the recording device control apparatus 1 is a computer system implemented using a microprocessor, a ROM (Read Only Memory), a RAM (Random Access Memory), a hard disk device, and the like. Computer programs are stored in the ROM or the hard disk device.

The functions of the units of the recording device control apparatus 1 shown in FIG. 1 are realized by the microprocessor executing the computer programs. Furthermore, storage of information is implemented using the RAM and the hard disk device.

The following describes each unit of the recording device control apparatus 1.

The file system 400 has functions of receiving transfer requests from applications to transfer data to the recording device 400, and, after adding information to the transfer requests, sending the transfer requests to a request reception unit 110. Here, the information that the file system 400 adds to each transfer request includes a file handle of transfer target data, an access type such as read or write, a data type showing whether or not the transfer target data is management information, and a sector location in the recording device 200.

The following describes one example of information included in a transfer request when a request to write data to the recording device 200 is received from an application for recording a television program or a dubbing application.

The file system 400 determines whether the transfer data is recording data or dubbing data according to the file handle of the command issued from the application. When a write command has been issued by the application, the file system 400 treats this as a write request for recording data or dubbing data, and when a sync command has been issued, the file system 400 treats this as a management information write request for writing management information so that data written to the recording device 200 is recognizable by the file system 400. The sector location in the recording device 200 for the transfer target data is determined by the file system 400 allocating a sector of a free block based on the management information.

A transfer control unit 100 has functions of holding transfer requests received from the file system 400, determining, from among the held transfer requests, a transfer request for transferring data to the recording device 200, and transferring the selected transfer target data to the recording device 200. The transfer control unit 100 includes the request reception unit 110, a queue management unit 120, a transfer request determination unit 130, and a transfer unit 140.

The following describes each unit of the transfer control unit 100.

The request reception unit 110 has the functions of receiving transfer requests from the file system 400, and sending the received transfer requests to the queue management unit 120 in the received order.

The queue management unit 120 has the functions of holding the transfer requests connected in a list structure in the order in which they are received from the request reception unit 110, and on receiving information of a transfer request that is a transfer target from a request judgment unit 133 (described later), deleting the corresponding transfer request data from the transfer request list.

The transfer request determination unit 130 has a function of selecting a transfer target from among transfer requests in the transfer request list in the queue management unit 120. The determination unit 130 is composed of a transfer criterion judgment unit 131, a management information judgment unit 132, and a request judgment unit 133. The following describes each of these units.

The transfer criterion judgment unit 131 has functions of focusing on one of the transfer requests connected to the transfer request list in the queue management unit 120, judging whether or not the transfer priority level of the file handle of the corresponding transfer target data is higher than the priority level of file handles of other transfer target data connected in the transfer request list in the queue management unit 120, and sending a result of the judgment to the management information judgment unit 132.

The management information judgment unit 132 has a function of, when the transfer target data being focused on connected in the transfer request list in the queue management unit 120 is management information, judging whether or not a transfer request exists for management information that is before the focus transfer request, and sending a result of the judgment to the request judgment unit 133.

The request judgment unit 133 has a function of sending, to the transfer unit 140, information showing the focus transfer request, when no transfer request that has a file handle identical to the transfer target data of the focus transfer request is before the focus transfer request in the transfer request list of the queue management unit 120.

The transfer unit 140 has functions of receiving information of the transfer request that is the transfer target from the request judgment unit 140, and transferring, to the recording device 200, the transfer target data of the transfer target, the transfer target data including information showing the transfer destination.

The recording device 200 is a recording medium such as a hard disk or a DVD.

<Data>

Figure 2:
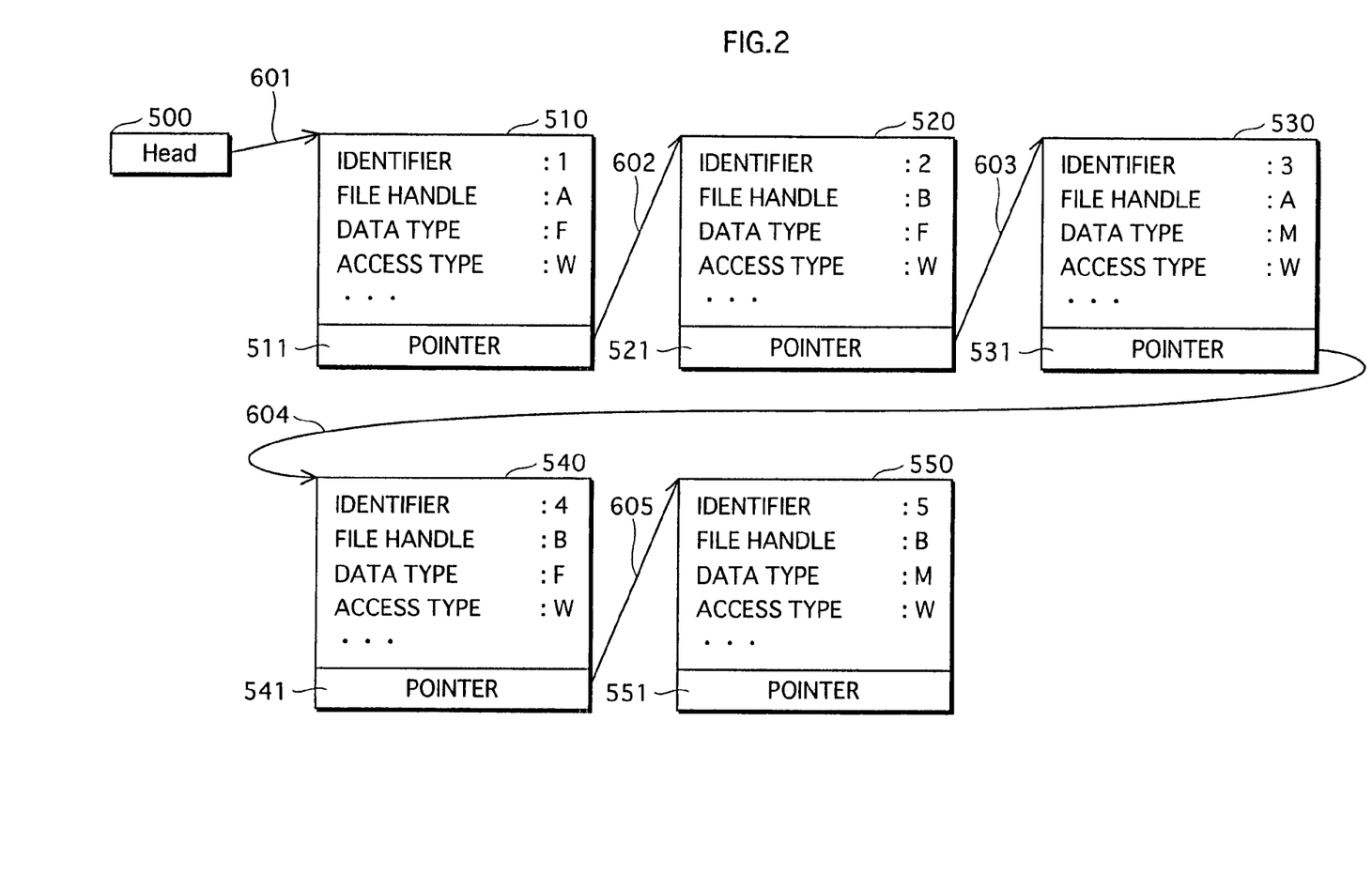
FIG. 2 shows an example of a transfer request list held by a queue management unit 120.

FIG. 2 shows an example of a transfer request list held by the queue management unit 120.

The transfer request list is read by the transfer request determination unit 130, and updated by the queue management unit 120 when a transfer request has been selected to be a transfer target.

A head 500 is a head pointer. The transfer requests are connected according to a list structure in the order indicated by arrows 601 to 605. Each transfer request is composed of a file handle, a data type, an access type, and so on.

Here, data type F shows file data and M shows management information. Access type W shows a write. This data corresponds to transfer requests in a transfer request table 60 in FIG. 4B (described later).

Furthermore, the transfer request for management information having an identifier 3 is a write request to write management information relating to transfer target data having an identifier 1 when a sync command of a file handle A was issued. The transfer request for management information having an identifier 5 is management information when a sync command of a file handle A was issued, to which has been added management information relating to transfer target data having identifiers 2 and 4, respectively.

Figure 3A:
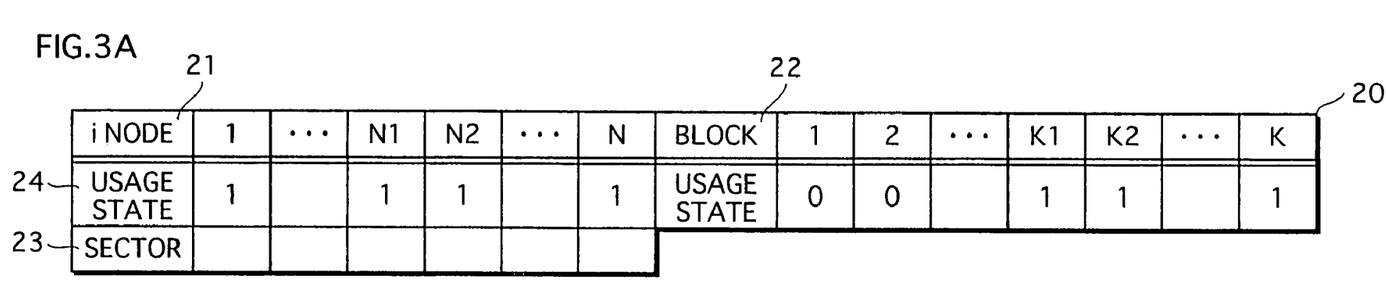
FIGS. 3A to 3C show examples of structure and content of a management information table.
Figure 3B:
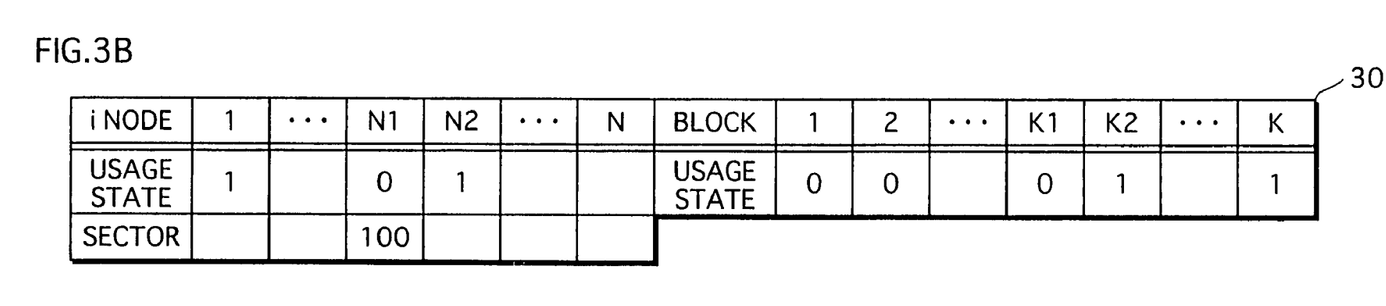
Figure 3C:
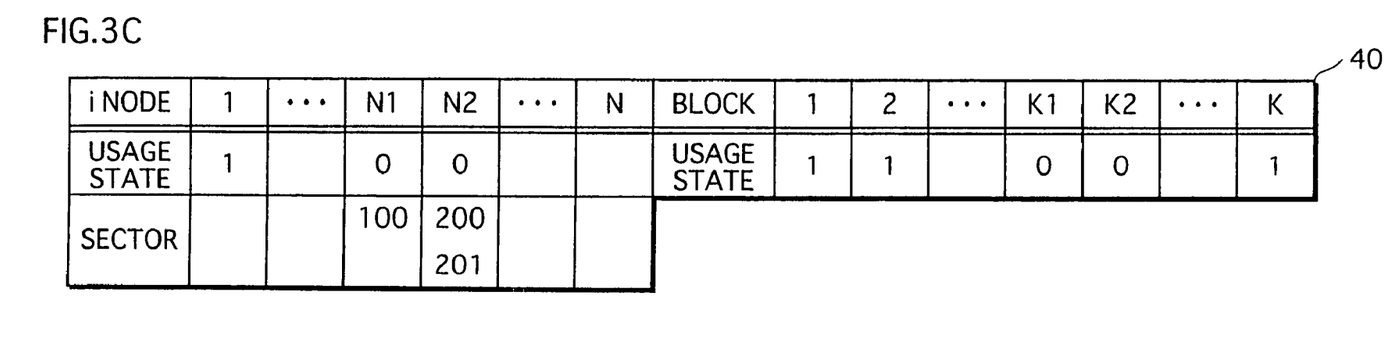

The following describes FIGS. 3A, 3B, and 3C.

FIGS. 3A, 3B, and 3C each show management information stored in the recording device 200.

The management information is composed of free block information made up of i nodes 21 and usage states 24, i node information that corresponds i nodes and sectors 23, and free block information made up of blocks 22 in the recording device and usage states 24.

Here, the file system 400 corresponds files in the recording device 200 with i nodes that are a data structure holding control information relating to files, and is able to uniquely identify each file by the corresponding i node.

Furthermore, the management information is read to the memory by the file system 400 when a transfer request has been issued by the application, and the transfer unit 140 updates the management information in the recording device 200.

In each of FIGS. 3A, 3B, and 3C, i nodes 21 are i node numbers in correspondence with files recorded in the recording device 200, the file system 400 managing i nodes 1 to N. The usage states 24 express whether or not i node numbers and block numbers are in use, expressing that an i node number or block number is in use, and 1 expressing that an i node number or block number is not in use. Sector locations 23 show sector locations in the recording device 200 where data of a file corresponding to an i node 21 is stored.

The following describes the data in each of FIGS. 3A, 3B, and 3*c*.

FIG. 3A shows data of management information before the file system 400 determines the sector location of the transfer target data of the transfer request list shown in FIG. 2.

On receiving, from the application, a transfer request connected in the transfer request list of FIG. 2 before the sector location of the transfer target data is determined, the file system 400 reads the management information 20 shown in FIG. 3A. When a file does not exist for transfer target data, the file system 400 determines an i node based on the free i node information in FIG. 3A, determines a transfer destination block for the transfer target data based on the free block information, determines the sector location of the transfer destination based on the i node information, and updates the management information in the memory.

FIG. 3B shows management information when a piece of transfer target data having an identifier 3 in the transfer request list in FIG. 2 is written to the recording device 200.

As described with respect to FIG. 2, the management information that is the transfer target information having the identifier 3 relates to the transfer target data having the identifier 1 of the file handle A. FIG. 3B shows where the transfer target data having the identifier 1 is stored in the recording device 200. The i node showing the identifier 1 of the file handle A is N1, the block in which the piece of transfer target data having the identifier 1 is stored is K1, and the transfer target data having the identifier 1 is written in the sector 100.

The following describes FIG. 3C.

FIG. 3C shows management information when the piece of target data having the identifier 5 in the transfer request list in FIG. 2 is written to the recording device 200.

As with FIG. 3B, the management information that is the transfer target data of the identifier 5 relates to the transfer data having the identifier 2 and the transfer data having the identifier 4 of the file handle B, and FIG. 3C is the management information of FIG. 3B to which information storing the transfer target data information having the identifiers 2 and 4 has been added.

The i node that shows the file handle B of the identifiers 2 and 4 is N2, the block in which the transfer target data of the identifiers 2 and 4 is stored is K2, and these transfer target data are stored in sectors 200 and 201, respectively.

Figures 4A, 4B:
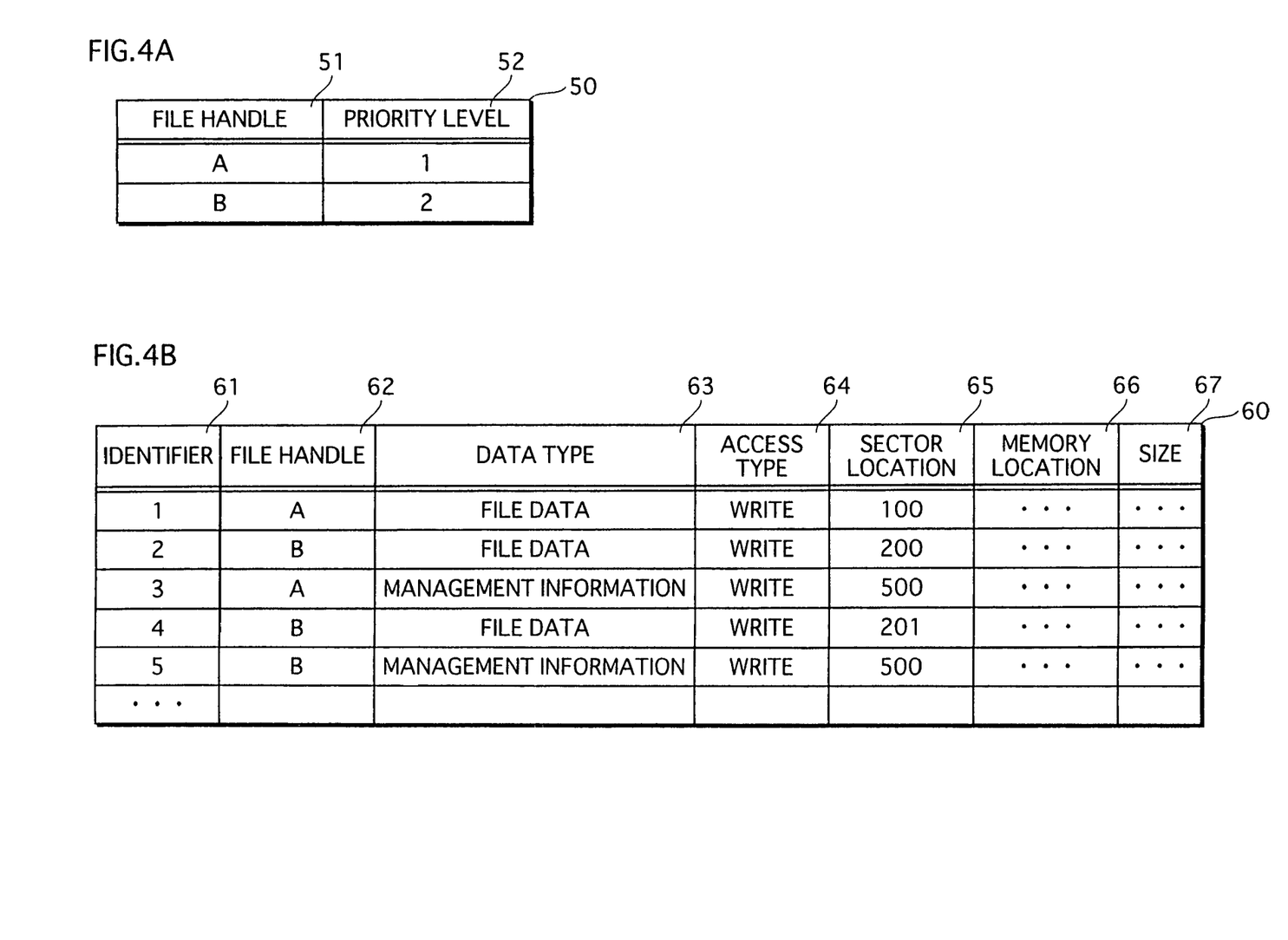
FIGS. 4A and 4B show examples of structure and content of priority level information and a transfer request table.

The following describes FIGS. 4A and 4B.

FIG. 4A shows an example of the structure and content of a priority level information table 50. As shown in FIG. 4A, the priority level information table 50 is composed of file handles 51 and priority levels 52, and is set depending on the transfer target data.

Here, each file handle 51 is information expressing a file belonging to data relating to a transfer request issued by the application.

Each priority level 52 shows the priority level of a write to the recording device 200. The file system 400 processes according to priority write requests of data whose file handle has a priority level with a high numeric value.

Furthermore, FIG. 4B shows an example of the structure and contents of a transfer request table 60. The transfer requests correspond to the transfer requests connected in the transfer request list shown in FIG. 2.

As shown in FIG. 4B, the transfer request table 60 is composed of identifiers 61, file handles 62, data types 63, access types 64, sector locations 65, memory locations 66, and sizes 67. The file system 400 determines the sector location of the transfer destination or transfer origin of the transfer target data and sends this information to the request reception unit 110, and the information is read by the transfer request determination unit 130.

Each identifier 61 is information showing an identity of a transfer request.

Each file handle 62 is information showing a file of data relating to a transfer request, and when the data relating to the transfer request is management information, the file handle 62 is a file handle belonging to an i node.

Each data type 63 shows whether a piece of transfer target data is management information or is file data other than management information.

Each access type 64 shows a type of access to the recording device 200. For example, the access type 64 is "read" in the case of a read command being sent from the application, and "write" in the case of a write command being sent from the application.

Each sector location 65 shows a sector location in the recording device 200. When the access type 64 of a transfer request is "write", data relating to the transfer is recorded in the sector location, and when the access type 64 is "read", data is read from the sector location.

Note that the file system 400 pre-determines that management information relating to file data of file handles A and B are all to be stored in a sector 500 of the recording device 200.

Each memory location 66 shows an address location in the memory of the recording device control apparatus 1. When the access type 64 of a transfer request is "write", data in the memory location 66 is written to the recording device 200, and when the access type 64 is "read", data is read from the memory location 66.

Each size 67 shows the size of data relating to a transfer request.

<Operations>

The file system 400 receives write command and sync command transfer requests issued by the application, determines the file handle, the data type and the access type of each transfer request, reads the management information in the recording device 200 to the memory to determine the sector of transfer target data based on the management information, and sends transfer requests (FIG. 4B) that include information of the transfer request memory location and the transfer target data size, to the request reception unit 110 in the order in which they were received from the application.

The request reception unit 110 sends the transfer requests to the queue management unit 120 in the order they were received from the file system 400, and the queue management unit 120 connects the transfer requests to the transfer request list (FIG. 2) in the order in which they were received.

Figure 5:
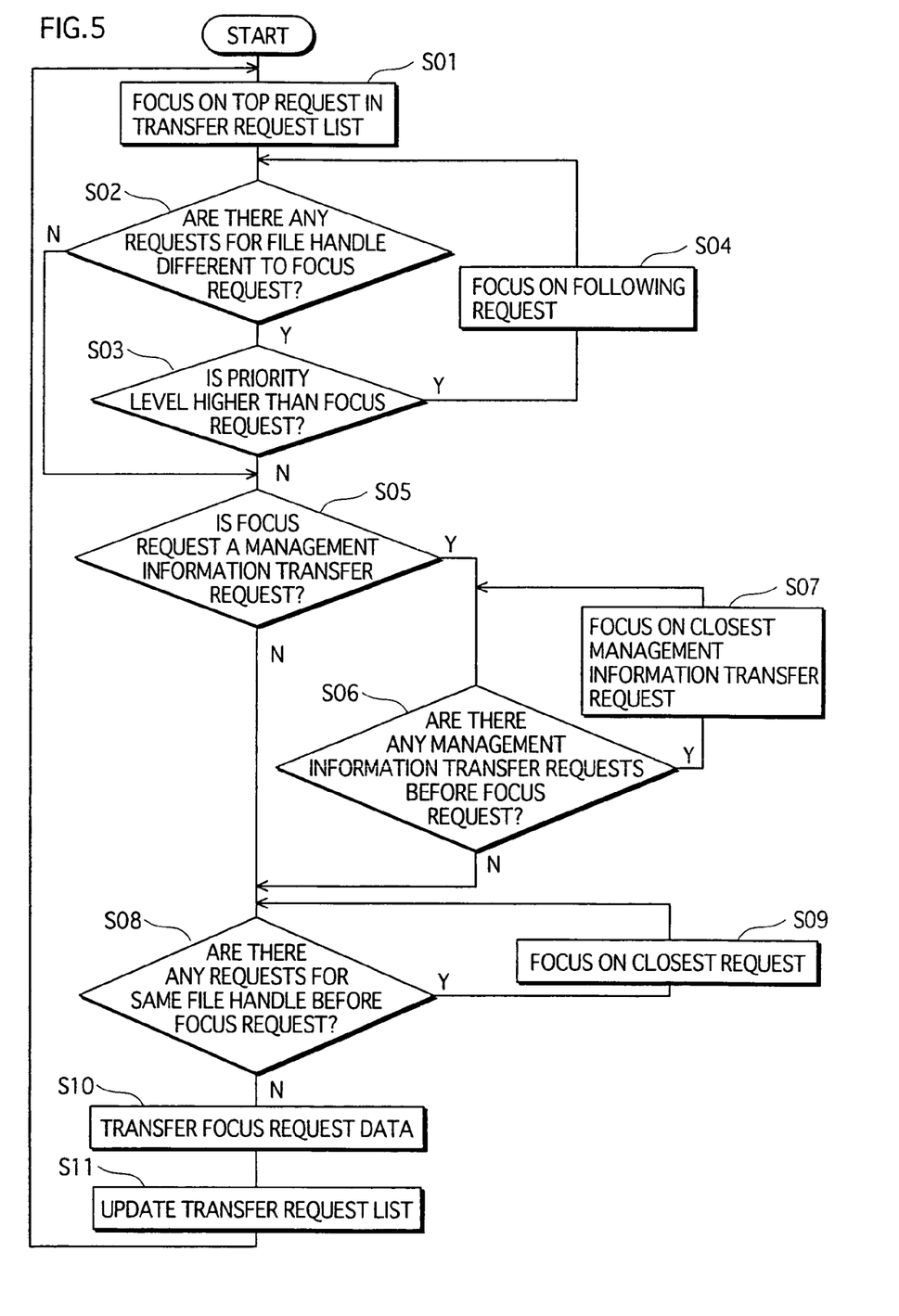
FIG. 5 is a flowchart showing transfer request determination processing by a transfer request determination unit 130.

FIG. 5 shows the flow of operations for the transfer request determination unit 130, which is the characteristic part of the present invention, to set a transfer request connected to the aforementioned transfer request list as a transfer target, and for the transfer unit 140 to transfer the transfer target data to the recording device 200.

Note that the cycle of the operations is determined according to control demands for transferring data according to priority. For instance, if high priority data must be transmitted in a fixed period, the operations for the transfer requests that have been sent from the file system 400 and are being held by the queue management unit 120 are performed in that fixed period.

The following describes the flow shown in the drawing.

First, on receiving transfer requests from the file system 400, the request reception unit 110 sends the transfer requests to the queue management unit 120 in the order in which they were received. The queue management unit 120 receives the transfer requests sent from the request reception unit 110, and holds the transfer request list in which the transfer requests are connected by pointers.

The transfer request determination unit 130 focuses on the transfer request held at the head of the transfer request list in the queue management unit 120 (step S01).

The transfer criterion judgment unit 131 reads the transfer request table 60, and judges whether or not any transfer requests in the transfer request list in the queue management unit 120 have a different file handle compared to the file handle 62 of the transfer request focused on at step S01 (hereinafter called the "focus transfer request") (step S02).

When the transfer criterion judgment unit 131 judges in the affirmative (step S02:Y), the transfer criterion judgment unit 131 reads the priority level table 50 (FIG. 4A), and judges whether the transfer request or requests that have the different file handle have higher transfer priority than the focus transfer request (step S03).

When the transfer criterion judgment unit 131 judges that the file handle of the focus transfer request has higher priority at step S03 (step S03:N), the transfer criterion judgment unit 131 sends information showing the judgment result to the management information judgment unit 132.

Next, the file management information judgment unit 132 reads the data type 63 from the transfer request table 60, and judges whether or not the focus transfer request is a management information transfer request (step S05).

When the management information judgment unit 132 judges in the negative at step S05 (step S05:N), the management information judgment unit 132 sends information showing the judgment result to the request judgment unit 133.

On receiving a negative judgment result from the management information judgment unit 132, the request judgment unit 133 judges whether any transfer requests that are connected to the queue management unit 120 before the focus transfer request have the same file handle as the focus transfer request (step S08).

When the request judgment unit 133 judges in the negative at step S08 (step S08:N), the request judgment unit 133 sends information showing the focus transfer request, to the queue management unit 120 and the transfer unit 140. On receiving the information, if the data of the transfer request relating to the received information is management information, the transfer unit 140 reads the data of the management information stored in the memory location 66 and having the corresponding identifier 61 from the transfer request table 60, and updates the management information of the designated sector location in the recording device 200 (step S10). The queue management unit 120 deletes, from the transfer request list, the transfer request relating to the information received from the request judgment unit 133, and updates the transfer request list (step S11).

Furthermore, when the transfer criterion judgment unit 131 judges in the negative at step S02 (step S02:N), the transfer criterion judgment unit 131 sends information showing the judgment result to the management information judgment unit 132, and operations move to step S05.

Furthermore, when the transfer criterion judgment unit 131 judges at step S03 that the file handle of the focus transfer request has lower priority (step S03:N), transfer of the focus transfer request is withheld, the transfer request following the focus transfer request is then focused on (step S04), and step S02 is performed with respect to the transfer request that is now being focused on.

Furthermore, at step S05, when the management information judgment unit 132 judges that the transfer target data of the focus transfer request is management information (step S05:Y), the management information judgment unit 132 judges whether or not there are any transfer requests connected before the focus transfer request in the queue management unit 120 whose data relating to transfer is management information (step S06).

When the management information judgment unit 132 judges in the negative at step S06 (step S06:N), the management information judgment unit 132 sends information showing the judgment result to the request judgment unit 133, and step S08 is performed. Furthermore, when the management information judgment unit 132 judges in the affirmative at step S06 (step S06:Y), the management information judgment unit 132 focuses on the closest transfer request, to the focus transfer request, that is for management information (step S07), and step S06 is performed.

Furthermore, when the request judgment unit 133 judges in the affirmative at step S08 (step S08:Y), the request judgment unit 133 focuses on transfer request closest to the focus transfer request (step S09), and step S08 is performed.

Next, the transfer request determination unit 130 repeatedly performs the described processing (step S01 to step S11), with respect to the transfer requests held in the queue management unit 120, until no transfer requests remain connected in the transfer list of the queue management unit 120.

<Operation Example>

The following describes operations of the transfer request determination unit 130 and the transfer unit 140 using the example in FIG. 2 following the described operations (FIG. 5), and with use of FIG. 3 and FIG. 4.

At step S01 of FIG. 5, the transfer request determination unit 130 focuses on the transfer request shown by the head 500.

The transfer criterion judgment unit 131 judges whether or not there are any transfer requests having a file handle that is different than the file handle A in the transfer request list in the queue management unit 120 (step S02).

On judging that there are transfer requests having a file handle B in the transfer request list (FIG. 2) (step S02:Y), the transfer criterion judgment unit 131 reads the priority level table 50 (FIG. 4A), judges that the transfer requests having the file handle B have higher priority (step S03:Y), and focuses on the transfer request 520 having the identifier 2 that follows the transfer request 510 having the identifier 1 (step S04).

As above, the transfer criterion judgment unit 131 performs the judgments of step S02 and step S03 for the transfer request 520 that has the identifier 2 (step S02:Y, step S03:N), and sends information showing the judgment results to the management information judgment unit 132.

Next, the management information judgment unit 132 reads the transfer request table 60 (FIG. 4B), judges that the data type 63 of the transfer request 520 having the identifier 2 is file data (step S05:N), and sends information showing the result of the judgment to the request judgment unit 133.

On judging that there are no transfer requests having the file handle B before the transfer request having the identifier 2 in the transfer request list (step S08:N), the request judgment unit 133 sends the judgment result and the transfer request 520 that has the identifier 2 to the queue management unit 120 and the transfer unit unit 140.

The transfer unit 140 reads the file data of the transfer request 520 having the identifier 2 from the memory location 66 based on the transfer request table 60, and transfers the file data to the recording device 200 to be stored in the sector location 200 in the recording device 200.

The queue management unit 120 deletes the transfer request 520 having the identifier 2 from the transfer request list, and updates the transfer request list so that the pointer 511 of the transfer request 510 having the identifier 1 indicates the transfer request 530 having the identifier 3 (step S11).

Next, the transfer criterion judgment unit 131 performs the described judgment in order starting from the transfer request 510 that is indicated by the head 500, the transfer request 540 having the identifier 4 consequently becoming the focus request.

The management information judgment unit 132 and the request judgment unit 133 perform the judgments from step S05 to step S08 with respect to the transfer request 540 having the identifier 4. The request judgment unit 133 determines the transfer request 540 to be the transfer target (step S05:N, step S08:N), and the transfer unit 140 transfers the related transfer target data to the sector 201 of the recording device 200 (step S10).

The queue management unit 120 deletes the transfer request having the identifier 4 from the transfer request list, and updates the list so that the pointer 531 of the transfer request 530 having the identifier 3 indicates the transfer request 550 having the identifier 5 (step S11).

Once again, the transfer criterion judgment unit 131 performs the judgments at step S02 to step S03 in order from the transfer request 510 having the identifier 1, and focuses on the transfer request 550 having the identifier 5.

The management information judgment unit 132 reads the transfer request table 60, and judges that the data type 63 of the transfer request 550 having the identifier 5 is management information, and that the transfer request 530 having the identifier 3 and whose data type 63 is management information is before the transfer request 550 having the identifier 5 in the transfer request list (step S02:Y, step S03:Y, step S02:Y, step S03:N, step S05:Y, step S06:Y, step S06:N, and step S08:N).

The management information judgment unit 132 focuses on the transfer request 530 having the identifier 3 (step S07), judges that there are no management information transfer requests before the transfer request 530 (step S06:N), and sends information showing the judgment result to the request judgment unit 133.

The request judgment unit 133 reads the transfer request table 60, judges that the transfer request 510 having the file handle A is before the transfer request 530 having the identifier 3 in the transfer request list (step S08:Y), and focuses on the transfer request 510 having the identifier 1 (step S09). Furthermore, the request judgment unit 133 judges that there are no transfer requests having the file handle A before the transfer request 510 having the identifier 1 (step S08:N), and sends information showing the transfer request 510 having the identifier 1 to the transfer unit 140 and the queue management unit 120. The transfer unit 140 and the queue management unit 120 perform step S10 and step S11.

As a result of the described processing, the transfer request having the identifier 3 and the identifier 5 are in a state of being connected in the transfer request list of the queue management unit 140, and when step S01 to step S08 are performed with respect to these transfer requests, the transfer request having the identifier 3 becomes the transfer target (step S02:N, step S05:Y, step S06:Y, and step S08:N).

The transfer unit 140 transfers the management information stored in the memory location 66 of the identifier 3 in the transfer request table 60 (FIG. 4B) to the sector location 500 in the recording device 200 (step S10). As a result of the transfer, the data of the management information in the recording device 200 changes from that in FIG. 3A to that in FIG. 3B. Furthermore, the queue management unit 120 deletes the transfer request 530 from the transfer request list (FIG. 2) to update the transfer request list (step S11).

Steps S01 to S08 are performed in the same way with respect to the transfer request having the identifier 5, and when the transfer unit 140 transfers the management information that is the transfer target data to the sector location 500 in the recording device 200, the management information in the recording device 200 changes from that in FIG. 3B to that in FIG. 3C.

As a result of processing the transfer requests in the transfer request list of FIG. 2 in this way, transfers are made in the following order: identifier 2, identifier 4, identifier 1, identifier 3, identifier 5.

<Supplementary Remarks>

Although the recording device control apparatus relating to the present invention has been described based on the first embodiment, modifications such as the following may be made, and the present invention is not limited to the recording device control apparatus shown in the described first embodiment.

(1) In the first embodiment, the free i node information, the inode information and the free block information, which are management information, are described as being stored in continuous areas in the same sector. However, in other embodiments, it is possible to store the pieces of information in the same sector but not in continuous areas, or in different sectors.

In such a case, on receiving a sync command from the application, the file system 400 sends, to the request reception unit 110, a write request that designates a write location of the free block information, the i node information and the free i node information, and the queue management unit 120 connects a transfer request for management information that includes this information to the transfer request list. When transferring the management information, the transfer unit 140 transfers the information included in the transfer request to the respective sectors in order of the free block information, the i node information, and the free i node information.

(2) In the first embodiment, a description is given only of a case in which data recorded in the same area is management data, and at step S05 a judgment is made as to whether the focus transfer request is for management information. However, in other embodiments, this judgment is not limited to being made with respect to management information, and may be a judgment for determining whether or not there is a transfer request with respect to the same area before the focus transfer request. In this case, if there is a transfer request with respect to the same area, the focus is moved to the closest transfer request to the focus transfer request. This can be applied to cases in which management information is stored in the same area as described in the first embodiment, and to cases in which writing and reading are performed with respect to the same area.

(3) In the first embodiment, management information transfer requests are described as belonging to file handles of sync commands issued by the application. However, in other embodiments, the file system may judge in advance whether or not the file handle of the management information is A or B, or another file handle. When this is the case, the file system provides a link from the management information transfer request to the transfer request of file data having an identical file handle to the file handle of sync command issued for the management information transfer request. For example, when all pieces of management information belong to the file handle B, the request judgment unit 133 may judge whether or not there is a file data transfer request that is linked to the management information, and if there is a linked transfer request, transfer the data of the transfer request to which the link is made.

Furthermore, it is not necessary for the management information transfer request to belong to either of the file handles. When this is the case, management information transfer requests may all be treated as transfer requests that do not have file handles, and when the management information is transferred when transfer processing is performed in accordance with the priority levels, the management information transfer requests are processed in the order in which they were issued by the file system.

(4) In the first embodiment, in the case of the transfer request list in FIG. 2 for example, the management information having the identifier 3 is transferred before the management information having the identifier 5. However, when transfer target data having the identifier 1, which is before the transfer request having the identifier 5, is transferred, transfer of the management information having the identifier 3 may be omitted because the information relating to the file data having the identifier 1 is also included in the management information having the identifier 5. In this case, the queue management unit 120 deletes the transfer request for the management information having the identifier 3 from the transfer request list, and does not send the transfer request having the identifier 3 to the transfer unit 140.

(5) In the first embodiment, according to a sync command issued with predetermined time intervals by the application, the transfer requests thereof are treated as management information write requests. However, in other embodiments, management information write requests may be received according to write commands. Alternatively, when a close command is issued, this may be treated as a management information write request.

(6) In the first embodiment, the transfer control unit 100 determines a transfer target transfer request from among transfer requests received from the file system 400. However, in other embodiments the file system 400 may determine a transfer order by judging based on a transfer criterion shown in the flow in FIG. 5, and send the transfer requests to the transfer unit 140 in determined order, and the transfer unit 140 may transfer the data relating to the received transfer requests to the recoding device 200 in the received order.

(7) In the first embodiment, the priority levels for transfer are determined based on the file handles to which the transfer target data belongs. However, in other embodiments, the priority levels for transfer may be determined according to the application that issues the transfer requests. In this case, when issuing a transfer request, the application may attach information showing which application issued the transfer request and transfer this to the file system. This enables the file system to determine which application issued each transfer request.

Furthermore, requests to be transferred according to priority may be determined dynamically according to combinations of information such as priority level, request time and size. Suppose for instance that, among the transfer requests of the file handles A and B, the priority level and transfer bit rate of A is higher than B, and the transfer request time of B is earlier than the transfer request time of A. Here, when the transfer bit rate of A is maintained even if the transfer data of B is transferred before the transfer data of A, priority is given to the transfer request of B whose transfer request time is earlier than A.

(8) In the first embodiment, only write requests to the recording device are described. However, the invention may be applied to transfer requests for either writing or reading of data.

(9) In the first embodiment, the transfer request determination unit 130 judges whether or not transfer requests are transfer targets, in order from the head transfer request connected in the list structure in the queue management unit 120. However, in other embodiments, the judgment may be made starting from any transfer request held in the queue management unit 120.

(10) Furthermore, in the first embodiment, the queue management unit 120 connects transfer requests in a list structure. However, in other embodiments, the queue management unit 120 may hold the transfer requests in another structure such as an array.

(11) The present invention may be a computer-readable recording medium on which a computer program is recorded, such as a flexible disk, a hard disk, a CD-ROM, an MO, a DVD, a DVD-ROM, or a DVD-RAM. Furthermore, the present invention may be the aforementioned computer program conveyed over an electric communication network, a wired or wireless communication network, or a network of which the Internet is representative.

The recording device control apparatus of the present invention may be used in a hard disk recorder, a DVD recorder, or the like.

The invention claimed is:

1. A recording device control apparatus that successively receives transfer requests and controls transfer of data relating to the transfer requests to and from a recording device, each transfer request including type information for specifying a transfer data type, the recording device control apparatus comprising:
   a reception unit operable to receive the transfer requests;
   a queue management unit operable to manage a processing order of the received transfer requests;
   a transfer criterion judgment unit operable to determine which of the received transfer requests to set as a focus request based on a predetermined transfer criterion, the focus request being a transfer request to be processed next;
   a management information judgment unit operable to judge whether or not the focus request is a transfer request for management information, the management information being information to manage a file, and on judging that the focus request is a transfer request for management information, judge with reference to the processing order whether or not a transfer request for management information exists before the focus request;
   a request judgment unit operable to:
   (1) judge with reference to the processing order whether or not a transfer request having type information identical to the type information of the focus request exists before the focus request;
   (2) specify data relating to the focus request as a transfer target when the management information judgment unit judges that a transfer request for management information does not exist before the focus request; and,
   (3) set a transfer request for management information closest to the focus transfer request, as the focus request, when the management information judgment unit judges that a transfer request for management information exists before the focus request, and
   a transfer unit operable to transfer the data specified by the request judgment unit.

2. The recording device control apparatus of claim 1, wherein
   each transfer request further includes area information that shows an area that is a transfer destination or a transfer source in the recording device,
   the management information judgment unit is operable to judge with reference to the processing order whether or not a transfer request exists before the focus request for management information that includes area information identical to the area information of the focus request on judging that the focus request is a transfer request for management information, and
   when the management information judgment unit judges that no transfer request for management information that includes area information identical to the area information of the focus request exists before the focus request, the request judgment unit is operable to send a judgment result to a request judgment unit.

3. The recording device control apparatus of claim 1, wherein:
   the reception unit is operable to receive a first transfer request and a second transfer request; and
   the transfer criterion judgment unit is operable to judge whether or not the first transfer request is to be set as the focus request and is operable to determine which of the transfer requests to set as the target request, based on one of (a) whether or not the type information of the first transfer request and the type information of the second transfer request are different from each other, and (b) a result of comparing a priority level of the first transfer request and a priority level of the second transfer request.

4. The recording device control apparatus of claim 1, wherein:
   the reception unit is operable to receive a first transfer request and a second transfer request; and
   the transfer criterion judgment unit is operable to judge that neither of the first transfer request and the second transfer request is to be set as the focus request, and is operable to determine that a transfer request following the first transfer request is to be set as the focus request, when the type information of the first transfer request and the type information of the second transfer request are different from each other and the priority level of the second transfer request is higher than the priority level of the first transfer request.

5. The recording device control apparatus of claim 1, wherein
   the request judgment unit is operable to specify the data relating to the focus request as the transfer target when no transfer request having type information identical to the type information of the focus request exists before the focus request.

6. The recording device control apparatus of claim 1, wherein
   the request judgment unit is further operable to set the transfer request closest to the focus request and that has type information identical to the type information of the focus request, as the focus request, on judging that a transfer request having type information identical to the type information of the focus request exists before the focus request.

7. The recording device control apparatus of claim 1, wherein:
   the management information judgment unit is further operable to judge with reference to the processing order whether or not a transfer request for management information exists after the focus request on judging that the focus request is a transfer request for management information; and
   the request judgment unit is further operable to exclude the focus request from being a transfer target when the management information judgment unit judges that a transfer request for management information exists after the focus request.

8. The recording device control apparatus of claim 7, wherein:
   the reception unit is further operable to receive an omission instruction that instructs omission of transfer of redundant management information; and
   the request judgment unit is operable to exclude the focus request from being a transfer target only if the reception unit receives the omission instruction.

9. A recording device control method for successively receiving transfer requests and controlling transfer of data relating to the transfer requests to and from a recording device, each transfer request including type information for specifying a transfer data type, the recording device control method comprising:
   receiving the transfer requests;

managing a processing order of the received transfer requests;

determining which of the received transfer requests to set as a focus request based on a predetermined transfer criterion, the focus request being a transfer request to be processed next;

judging whether or not the focus request is a transfer request for management information, the management information being information to manage a file, and when the focus request is a transfer request for management information, judging with reference to the processing order whether or not a transfer request for management information exists before the focus request;

judging with reference to the processing order whether or not a transfer request having type information identical to the type information of the focus request exists before the focus request and specifying data relating to the focus request as a transfer target on judging that a transfer request for management information does not exist before the focus request;

setting a transfer request for management information closest to the focus transfer request, as the focus request, on judging that a transfer request for management information exists before the focus request; and transferring the specified data.

10. A computer program recorded on a computer-readable recording medium for successively receiving transfer requests and controlling transfer of data relating to the transfer requests to and from a recording device, each transfer request including type information for specifying a transfer data type, the computer program causing a computer to execute at least the following:

receiving the transfer requests;

managing a processing order of the received transfer requests;

determining which of the received transfer requests to set as a focus request based on a predetermined transfer criterion, the focus request being a transfer request to be processed next;

judging whether or not the focus request is a transfer request for management information, the management information being information to manage a file, and when the focus request is a transfer request for management information, judging with reference to the processing order whether or not a transfer request for management information exists before the focus request;

judging with reference to the processing order whether or not a transfer request having type information identical to the type information of the focus request exists before the focus request and specifying data relating to the focus request as a transfer target on judging that a transfer request for management information does not exist before the focus request;

setting a transfer request for management information closest to the focus transfer request, as the focus request, on judging that a transfer request for management information exists before the focus request; and transferring the specified data.

* * * * *